United States Patent [19]

Mancini

[11] 4,381,906

[45] May 3, 1983

[54] APPARATUS FOR PRODUCING RAVIOLI AND THE LIKE

[76] Inventor: Ugo Mancini, 334 Church St., Mt. View, Calif. 94041

[21] Appl. No.: 309,566

[22] Filed: Oct. 8, 1981

[51] Int. Cl.³ .................. B29C 11/00; B29D 3/00; A23L 1/16
[52] U.S. Cl. ............................ 425/106; 425/112; 425/115; 425/121; 425/122; 425/127; 425/298; 425/301; 425/316; 425/362; 425/363; 425/510
[58] Field of Search .............. 99/430, 432, 450.1, 99/450.2, 450.3, 450.4, 450.6; 425/106, 112, 115, 121, 127, 145, 298, 301, 316, 362, 363, 122

[56] References Cited

U.S. PATENT DOCUMENTS

| | | | |
|---|---|---|---|
| 1,844,142 | 2/1932 | Barili | 99/450.2 |
| 2,001,792 | 5/1935 | Lombi | 99/450.2 |
| 2,227,728 | 1/1941 | Lombi | 99/450.2 |
| 3,186,362 | 6/1965 | Ianuzzi | 425/298 |
| 3,467,056 | 9/1969 | Mills | 425/301 |

FOREIGN PATENT DOCUMENTS

| | | | |
|---|---|---|---|
| 651349 | 10/1928 | Italy | 425/112 |
| 278165 | 10/1930 | Italy | 425/112 |
| 325464 | 3/1935 | Italy | 425/112 |

Primary Examiner—Willard E. Hoag
Attorney, Agent, or Firm—Paul L. Hickman

[57] ABSTRACT

An apparatus for the production of ravioli and like products characterized by a base, sidewalls rising from the base, a forming roller rotatably coupled to the sidewalls, a platen roller rotatably coupled to the sidewalls in proximity to the forming roller, and means for feeding two sheets of ravioli dough and associated ravioli filling between the two rollers. The forming roller is generally cylindrical and is provided with a cutting grid around its curved surface and a number of ravioli forming areas located within the interstices of the cutting grid. Each ravioli forming area includes a centrally located, saddle shaped relief surrounded by at least one, but preferably two, sealing ridges.

9 Claims, 6 Drawing Figures

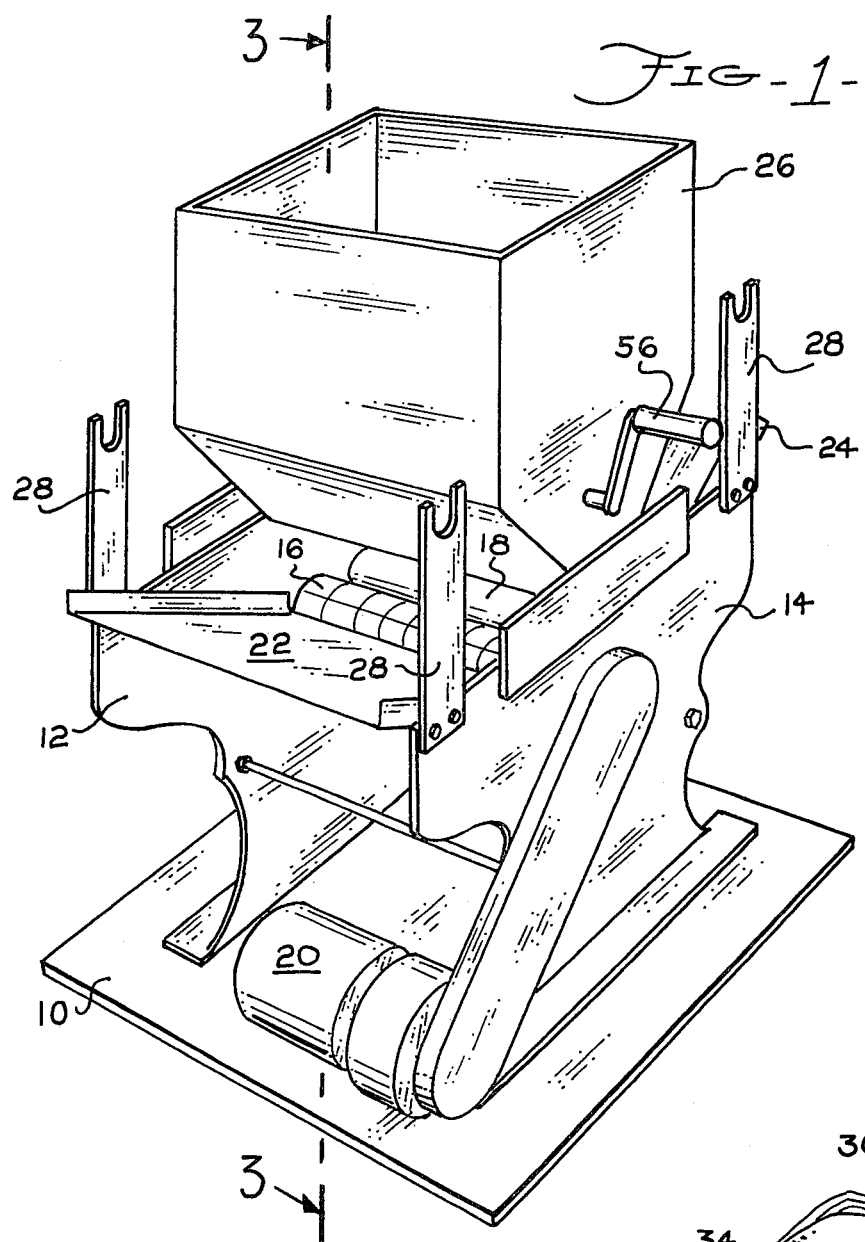
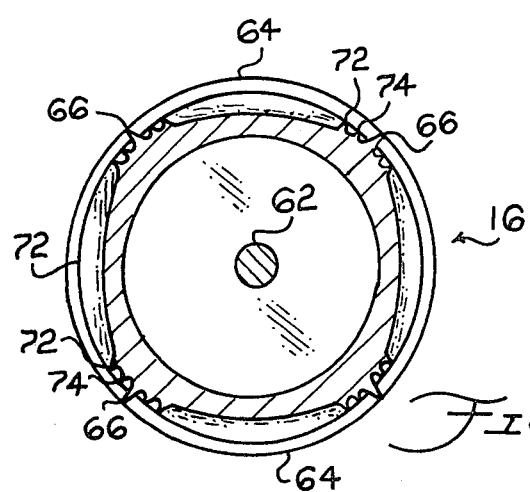
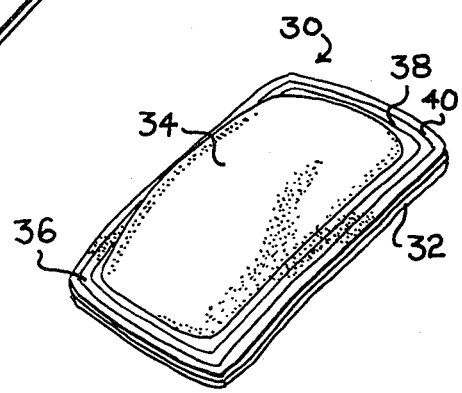

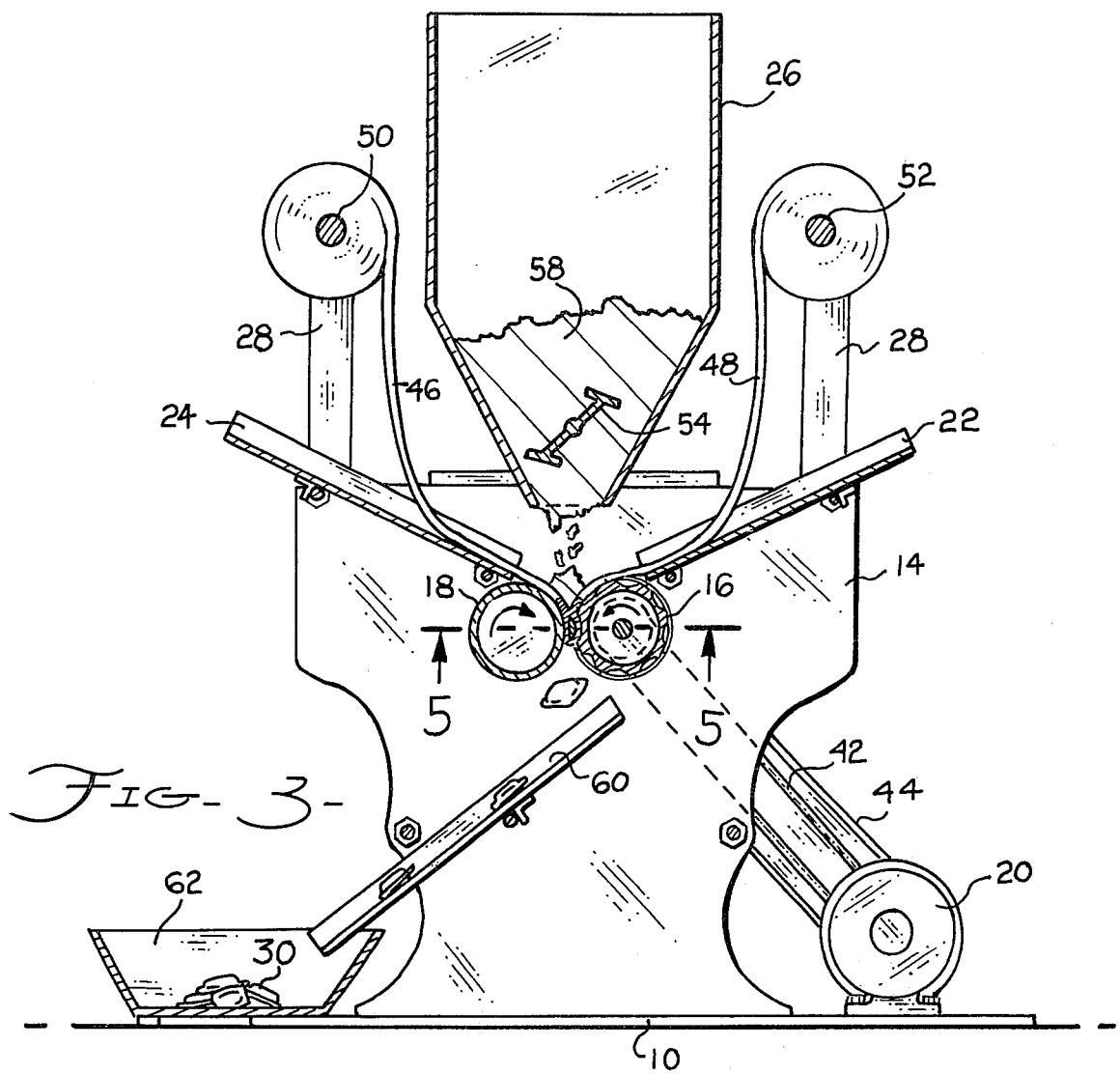
Fig-3-
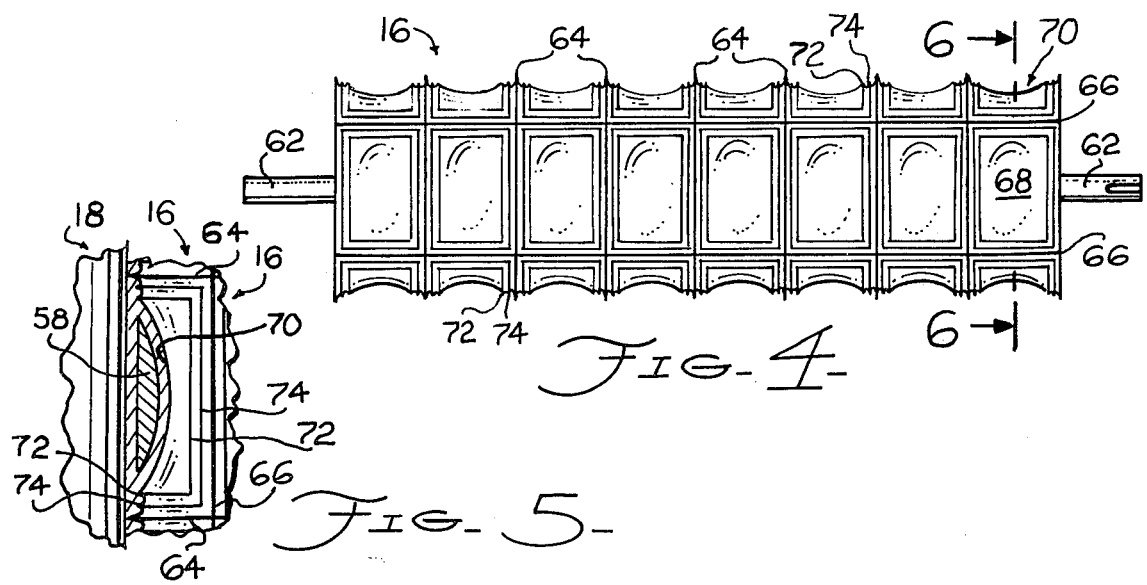
Fig-4-
Fig-5-

APPARATUS FOR PRODUCING RAVIOLI AND THE LIKE

BACKGROUND OF THE INVENTION

1. Field of the Invention

This invention relates generally to food preparation machines and more particularly to apparatus for producing ravioli and the like.

2. Description of the Prior Art

There are numerous machines for the mass production of prepared foodstuffs. Most of these prior art machines are large, complicated and expensive and are designed for use in huge food manufacturing plants rather than for use in the small business setting.

Many prior art machines produce foodstuffs of inferior quality, due to the trade-offs inherent with mass production techniques. For example, in the case of apparatus for producing ravioli and the like, the individual ravioli are often inadequately sealed, allowing their filling to leak out.

Also, many prior art machines can only produce one type of finished, prepared foodstuff. It would be useful to have a food preparation machine capable of turning out a moderate amount of a related variety of foodstuffs.

SUMMARY OF THE INVENTION

An object of this invention is to provide an apparatus of a non-complex design which is useful for producing quality ravioli and the like on a small, economical scale.

It is another object of this invention to provide an apparatus capable of producing a number of ravioli type products.

Briefly, the invention comprises a support including a pair of upright, facing sidewalls, a forming roller and a platen roller rotatably coupled to the sidewalls, a motor coupled to the forming roller by a drive belt, and means for feeding two sheets of ravioli dough and associated ravioli filling between the two rollers.

The platen roller is preferably a plain, cylindrical roller made from any of a variety of suitable materials. The forming roller is basically a rotary die and includes a cutting grid formed around its curved surface, and a number of ravioli forming areas provided within the interstices of the grid. The grid preferably takes the form of a first plurality of spaced apart cutting ridges extending circumferentially around the roller, and a second plurality of spaced apart, longitudinal cutting ridges intersecting the first plurality of cutting ridges. The ravioli forming areas are provided with a centrally located relief or recess, and are preferably surrounded by a concentric pair of sealing ridges. The forming roller is easily removable from the apparatus so that other rollers can be substituted to produce differently shaped ravioli type products.

In use, two sheets of dough and the filling are fed between the platen roller and the rotating forming roller. The forming roller shapes, seals, and cuts the sheets of dough to form the final product.

An advantage of this invention is its simplicity, which allows it to be manufactured at low cost, and which adds to its reliability. While the present invention will not produce huge volumes of ravioli products, it is an economical way for home, small business, restaurant, and deli owners to mass produce moderate amounts of ravioli.

Another advantage of this invention is that the forming roller double seals the ravioli, greatly lessening the chance that the ravioli filling might leak out.

Yet another advantage of this invention is that the forming rollers can be quickly interchanged so that the machine can produce a variety of ravioli-like products.

These and other objects and advantages of the present invention will no doubt become apparent upon a reading of the following descriptions and a study of the several figures of the drawing.

BRIEF DESCRIPTION OF THE DRAWING

FIG. 1 is a perspective view of the present invention.

FIG. 2 is a perspective view of a ravioli produced by the present invention.

FIG. 3 is a cross-sectional view taken along line 3—3 of FIG. 1.

FIG. 4 is a plan view of the forming roller 16 shown in FIGS. 1 and 3.

FIG. 5 is a magnified, broken cross-sectional view of a ravioli forming area of the forming roller.

FIG. 6 is a cross-sectional view taken along line 6—6 of FIG. 4.

DETAILED DESCRIPTION OF THE PREFERRED EMBODIMENT(S)

Referring to FIG. 1, an apparatus for the production of ravioli and the like in accordance with the present invention includes a base 10, a pair of sidewalls 12 and 14 rising from the base, a forming roller 16 and a platen roller 18 rotatably coupled between the sidewalls, a motor 20 coupled to base 10 for rotating forming roller 16, a pair of guide ramps 22 and 24 for guiding two sheets of ravioli dough between the rollers, and a hopper 26 containing ravioli filling. A number of support brackets 28 hold rolls of the dough (not shown in this figure).

With reference to FIG. 2, a ravioli 30 produced by the apparatus of FIG. 1 has a substantially flat base portion 32 and a domed portion 34 filled with ravioli filling and crimped onto the base at flanged area 36. It will be noted that the crimping of the base portion to the domed portion involves a pair of circumferential crimps 38 and 40 which provide a double seal to prevent the ravioli filling from leaking out.

In FIG. 3 a cross sectional view is used to illustrate the functioning of the apparatus. The shaft of motor 20 is coupled to forming roller 16 by a belt 42, which is covered by a belt guard 44. The motor causes the forming roller to rotate in a counter-clockwise direction, as indicated, to draw two sheets of dough 46 and 48 between the rollers. The sheets of dough are shown here to be wrapped into rolls around dowels 50 and 52. The ends of dowels 50 and 52 are supported by brackets 28.

Hopper 26 has a rectangular upper portion and a truncated, downwardly extending, gabled lower portion. An agitator/metering paddle 54 is located within the lower portion and is connected to a crank 56 (see FIG. 1). As the crank is rotated filling 58 is metered out of the hopper onto the two sheets of dough. The speed with which the crank is rotated is directly related to the amount of filling that will be within each of the finished ravioli.

The apparatus futher includes an output ramp 60 coupled between sidewalls 12 and 14. The lower end of the output ramp empties into a container for the finished ravioli 30.

With reference to FIGS. 4, 5, and 7, the forming roller is a substantially cylindrical member rotatable around an axial shaft 62. The curved surface of the forming roller is provided with a cutting grid made up of a first plurality of spaced apart cutting ridges 64 formed circumferentially around the roller, and a second plurality of spaced apart cutting ridges 66 formed parallel to the axial shaft and intersecting the first plurality of cutting ridges. A number of ravioli forming areas such as shown at 68 are provided within the interstices of the cutting grid, i.e. they are bounded on four sides by segments of the first plurality of cutting ridges and the second plurality of cutting ridges.

Each of the ravioli forming areas are provided with a centrally located, saddle shaped recess or relief 70. Surrounding the relief is at least one, but preferably two, sealing ridges 72 and 74. By "ridges" is meant portions of roll surface projecting above next adjacent surrounding portions of the roll surface on both sides thereof as shown in FIG. 6, at figure numbers 72 and 74. The double crimp in the flange area of the finished ravioli made by the two sealing ridges creates a superior seal between the base portion and the domed portion.

The forming roller is designed to be quickly and easily inserted into and removed from the rest of the apparatus. Forming rollers having differently dimensioned ravioli forming areas can produce a number of different ravioli type products, a few of which are listed below:

RAVIOLI 1-¼"×1-¼"
GANNELLONI 1"×3.5"
MANICOTTI 1"×3"
TUBOLINI (tm) ⅜"×2"
FISOLINI (tm) 1"×1.5"
TORTELLINI ⅝"×⅝"

In use, sheets of dough are formed into rolls and placed upon support brackets 28, and the hopper is filled with ravioli filling. The ends of the two sheets of dough are guided between the forming roller and platen roller by ramps 22 and 24. When motor 20 is actuated forming roller rotates in a counterclockwise direction and co-acts with the platen roller to cause it to rotate in a clockwise direction. The two sheets of dough are drawn between the two rollers. Simultaneously, hand crank 56 is rotated to deposit filling 58 on top of the two sheets of dough.

With particular reference to FIG. 5, it may be seen that parts of dough sheet 46 are formed into the ravioli base portions, while parts of dough sheet 48 are formed into the ravioli domed portions. The filling bulges into the domed portion and is double sealed therein by sealing ridges 72 and 74. Cutting ridges 66 cut the dough sheets laterally, and cutting ridges 64 cut the dough sheets longitudinally into separate, individual ravioli 30. The stuffed, formed, and sealed ravioli then fall down ramp 60 and into container 62.

The forming roller and the platen roller are of about the same size and are preferably made from a resilient and durable plastic, such as polyethylene. The sheets of dough, which are about nine inches wide and fourteen feet long, are rolled around hardwood dowels. The remainder of the apparatus is primarily made from sheet aluminum and stainless steel.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. An apparatus for the production of ravioli and the like comprising:
    (a) support means;
    (b) a substantially cylindrical forming roller rotatable around an axis and coupled to said support means, said forming roller being provided with a cutting grid around its curved surface and a plurality of ravioli forming areas within the interstices of said cutting grid, each ravioli forming area being provided with a centrally located relief surrounded by a first sealing ridge;
    (c) a platen roller rotatably coupled to said support means in proximity to said forming roller;
    (d) means for rotating at least one of said platen roller and said forming roller; and
    (e) means for feeding two sheets of ravioli dough and associated ravioli filling between said forming roller and said platen roller.

2. An apparatus as recited in claim 1 wherein said cutting grid includes a first plurality of spaced apart cutting ridges formed circumferentially around said forming roller, and a second plurality of spaced apart cutting ridges formed parallel to said axis and intersecting said first plurality of cutting ridges, whereby said forming areas are bounded on four sides by segments of said first plurality of cutting ridges and said second plurality of cutting ridges.

3. An apparatus as defined in claim 2 wherein said forming roller is further provided with a second sealing ridge surrounding each of said first sealing ridges.

4. An apparatus as claimed in claim 3 wherein said means for feeding two sheets of ravioli dough includes a first feed ramp coupled to said support means with a lower end thereof situated over said platen roller, and a second feed ramp coupled to said support means with a lower end thereof situated over said forming roller, whereby a first sheet of dough is directed between said platen roller and said forming roller by said first ramp, and said second sheet of dough is directed between said platen roller and said forming roller by said second ramp.

5. An apparatus as claimed in claim 4 wherein said means for providing said filling includes a hopper containing said filling that is disposed over said first ramp and said second ramp, and means for metering said filling from said hopper onto said first sheet of dough and said second sheet of dough.

6. An apparatus as claimed in claim 5 further comprising a first feed roller coupled to said support means over said first feed ramp, and a second feed roller coupled to said support means over said second feed ramp, whereby said first sheet of dough is trained over said first feed roller, and said second sheet of dough is trained over said second roller.

7. A roller die for the production of ravioli and the like comprising a member rotatable around an axis, said member having a curved surface provided with a cutting grid and a plurality of ravioli forming recesses within interstices of said grid, a projecting sealing ridge being positioned inside of said grid and surrounding each of said ravioli forming recesses.

8. An apparatus as recited in claim 7 wherein said cutting grid includes a first plurality of spaced apart cutting ridges formed at least partially around said curved surface, and a second plurality of spaced apart cutting ridges formed substantially parallel to said axis and intersecting said first plurality of cutting ridges, whereby said forming areas are bounded on four sides by segments of said first plurality of cutting ridges and said second plurality of cutting ridges.

9. An apparatus as claimed in claim 8 wherein each of said ravioli forming areas include two, concentric sealing ridges surrounding said recess.

* * * * *